United States Patent [19]

Pryor

[11] Patent Number: 4,898,537

[45] Date of Patent: Feb. 6, 1990

[54] LOCATING SYSTEM FOR MAPS AND OTHER DIAGRAMS AND DISPLAYS

[76] Inventor: Paul L. Pryor, 10 Lonsdale Ave., Dayton, Ohio 45419

[21] Appl. No.: 283,100

[22] Filed: Dec. 12, 1988

[51] Int. Cl.$^4$ ............................................. G09B 19/00
[52] U.S. Cl. .................................... 434/130; 434/150; 434/324; 434/326
[58] Field of Search ............... 434/150, 153, 324, 326, 434/331, 348, 349, 327, 335, 130, 131

[56] References Cited

U.S. PATENT DOCUMENTS 1,705,657  3/1929  Clapp et al. ......................... 434/326
3,735,499  5/1973  Forsdale ............................. 434/324

*Primary Examiner*—William H. Grieb
*Attorney, Agent, or Firm*—Biebel, French & Nauman

[57] ABSTRACT

Instructional devices include information, such as a map, instructions, or any other visually discernable type of information is formed on one surface and is physically and spatially related to information on a second surface, and in one embodiment, the first surface is a map of the world and a second surface is an antipodal map of the world reversed by 180°. By making a mark on the first surface, a Mark-Thru is produced at the corresponding point on the second surface. This concept is shown as applied to anaglyphs on which the information is projected on surfaces and on examinations or tests in which examination questions of multiple-choice type are formed on a first surface and the Mark-Thru indicates the correctness of answer on the second surface.

11 Claims, 3 Drawing Sheets

LOCATING SYSTEM FOR MAPS AND OTHER DIAGRAMS AND DISPLAYS

BACKGROUND OF THE INVENTION

This invention relates to the process of teaching or learning complex spatially related information. This invention also provides a means and procedure to assist in the administration of examinations. This last application also utilizes similar techniques for handling related information in a spatial manner.

Complex maps, charts, diagrams, and other pictorial or graphic data are often difficult to understand and interpret due to the great amount of information present. While color can often be used to clarify the presentation of information numerous labels lines and symbols can further cause confusion. Overlays in black and white and/or color can help clarify a complex situation but still small print and/or complex spatial relationship create difficulties.

Many designs or techniques for presenting maps, charts, diagrams and other pictorial or graphic data have been published and produced for public display such as "You are Here" maps, subway maps and teachers class room aids. Some of these are not clear. Others utilize small lights, electric or electronic manipulations and computers. This can be expensive and often awkward. For the teaching of certain concepts, such as antipodal points, elaborate techniques are not effective.

The basic concept common to all aspects of this invention is very simple and will become clear upon observing the following drawings and reading the following descriptions and claims. To facilitate and simplify the following discussion I would like to clarify my terminology with the following definitions:

(1) Record; in the context of this invention a record can be either a map, chart, diagram drawing or other graphic depiction as well as words, text and other verbal abstractions.

(2) Related; is any type of one to one relationship or correlation between any two or more records such as a point on a globe and its antipode, or in a diagram a part or position and its name, a question and its answer, a point on a curve and its coordinates, etc.

(3) Mark; in the context of this invention is any visible or tactical indication, either permanent or temporary, of a position on a record such as a pin prick, opaque mark, light, etc.

(4) Thru-Mark; is a visible or tactical mark on one record which produces a mark at the same position on another related record.

(5) To register; is the act of positioning one or more records in the plane of each record such that a second or other record is correctly positioned related to each other.

(6) In register; is the condition when two or more records are in correct positional relationship with each other.

SUMMARY OF THE INVENTION

The present invention is basically a simple technique and/or device that presents two or more different records in sequence, in a positionally related manner. By means of maintaining the correct positional relationship and a reference mark common to both records related and pertinent information becomes clearer. Some of the types of related information to which this invention can apply are as follows:

Point on globe and its antipode.
Questions and their correct answers.
Location of a point on a record and its coordinates.
Location of an item on a record and its name.

DETAILED DESCRIPTION OF THE PREFERRED EMBODIMENTS

Figure 1:
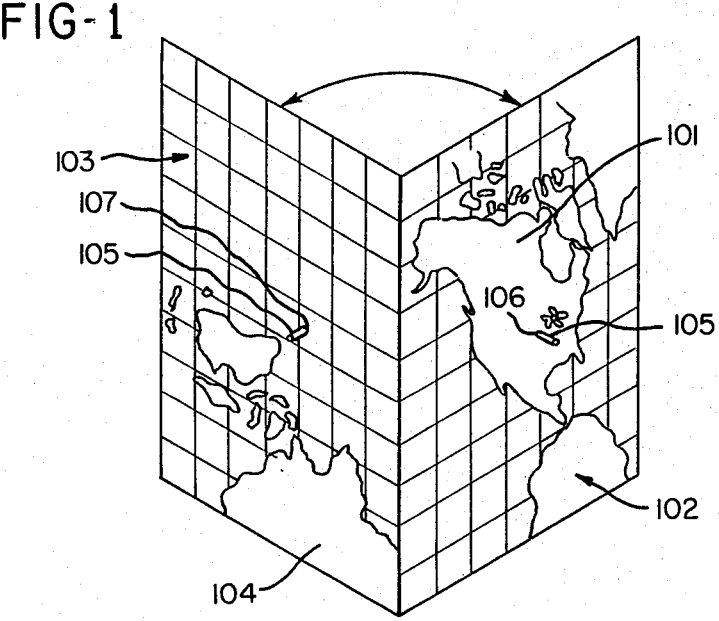
FIG. 1 is a perspective view of a two sided map of the world which illustrates the principle of this invention and an application which permits the location of the antipode of any point on the earth.

Referring in more detail to the drawings. FIG. 1 illustrates a map of the world as the copy denoted by 101 on one side (front surface) of a thin sheet denoted by 102, 103 represents the back side (rear surface) of sheet 2 (swung out for clarification). 104 is an antipodal projection of the world as illustrated in Map 101. An antipodal projection is one in which the projection, if it is a point projection, is made from the antipode of the point from which the first map is projected. This is strictly true for point projections such as an azimuthal equidistant projection. In the case of a Mercator or modified Mercator, such as shown in FIG. 1, which is a line projection the center longitude line is shifted 180°, i.e., from 90°W on Map 101 to 90°E longitude as the center of Map 104. The antipodal projection 104 either point or line projection is then rotated 180° with respect to the map on the opposite surface and properly registered.

A mathematical approach to locate the antipods of a point is to simply change the North latitude to South or vice versa, subtract the longitude from 180°, and change East to West or vice versa.

With the arrangement as shown in FIG. 1 a pin stylus, or peg 105 entering at any point on either side such as 106 on side 102 will exit the other side at the antipode 107 of the point 106 on Map 104. Other forms of a mark and Mark-Thru means than a pin, stylus or peg such as special marking techniques, lights, etc. could be used and will be discussed in reference to following figures.

Figure 2:
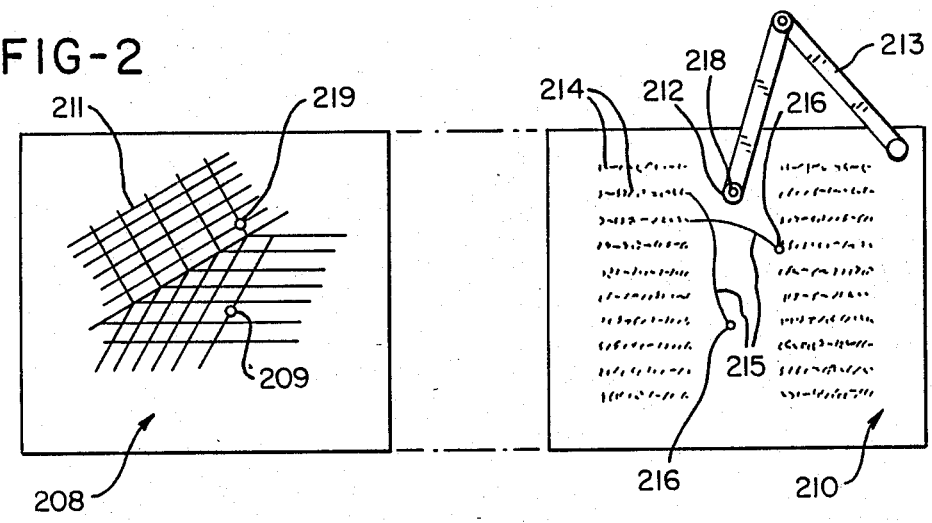
FIG. 2 is a view of a "You are Here" map for locating points of geographical interest by means of a marking light to Mark-Thru.

Another application of the techniques covered by this invention is illustrated in FIG. 2. FIG. 2 represents a "You are Here" type map which is often used in public places to direct strangers. On first surface side 208 is a map 211 with the "You are Here" location at 209. The map or sign is made of a light transmitting material. On the back or rear surface 210 of the Map 211 is a movable light 212 (on an articulated arm 213) such that any point on the surface 210 can be illuminated (marked with a bright spot that will mark through to side 208. The names of places of interest (lines 214) are arranged alphabetically (or other systematic manner) and lines 215 from these names are drawn to spots 216 directly opposite the location of the place on the Map 211. Light 212 is located over a spot such as 218 found by first locating the place desired in the list 214 and then following the line to 218. The light will then Mark-Thru to 219 which will indicate the location on the map 211 of the desired place.

This same locating system is applicable to smaller hand carried light transmitting maps with a hand-held see through light. Other marking and Mark-Thru means could be used to locate cities and other geographic features on this hand-held map with the gazetteer and related lines on the back surface.

Figure 3:
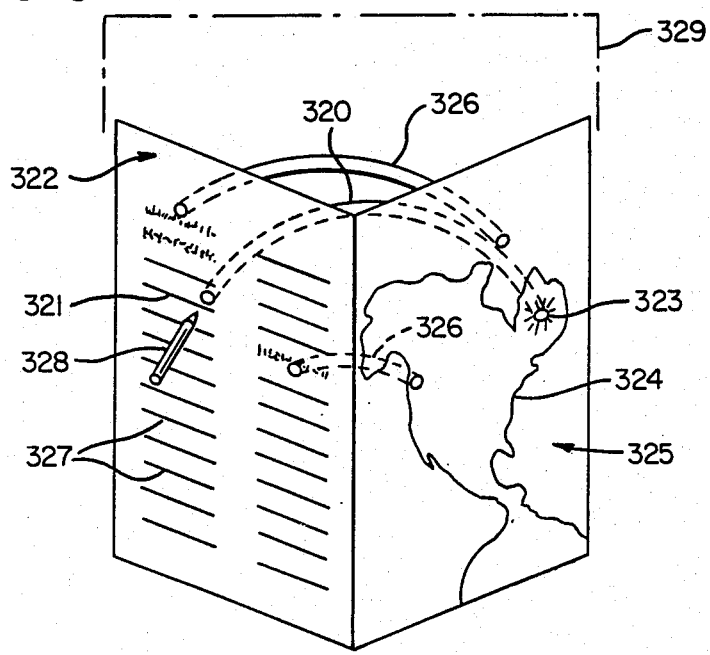
FIG. 3 is a perspective view illustrating an alternate method of locating points of geographical interest on a map such as FIG. 2 employing fiber optics.

FIG. 3 represents another version of the above device utilizing fiber optics, which permits both records to be placed on one side of a display panel or map board. Fiber optic connector or flexible light pipe 320 connects an Item 321 on the rear surface 322 to its related geographic location 323 on Map 324 on the front surface 325. Other fiber optic strands or flexible light pipes such as 326 connect all the items on the Gazetteer 327 to all the related geographic locations on Map 324 on the front side of 325. Only three optical connecting fibers 320 and 326 are shown for simplicity. When a light such as light pen 328 illuminates the end of a light fiber or light pipe such as 320, the other end at 323 is lighted, indicating the location of item 321. The reverse process will indicate the name of the geographic feature or item on the front side of map 324.

It is obvious that with this two-way fiber optic or light pipe technique it is not necessary to utilize both sides of the board to Mark-Thru. The two sides (FIG. 3) could be opened completely as with an open book and all the optical fibers or light pipes remain on the back side of 322 and 325. Both the Gazetteer 327 and Map 324 now form the front surface and the back can be covered with Box 329. This technique is less complex than small lights and three-wire connections to two switches.

This same locating system is applicable to smaller hand carried light transmitting maps with a hand-held see through light. Other mark and Mark-Thru means could be used to locate cities and other geographic features on this hand-held map with the gazetteer and related lines on the back surface.

Figure 4:
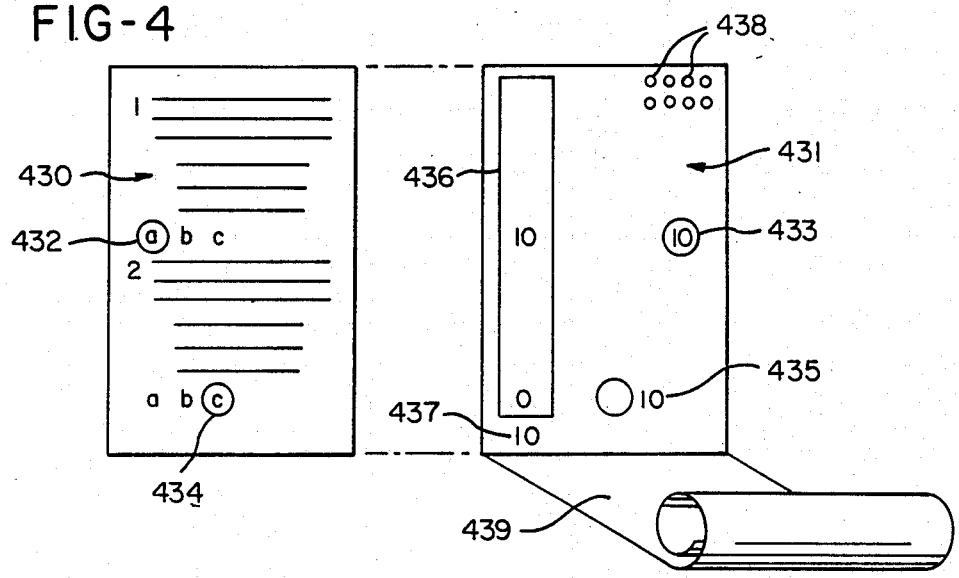
FIG. 4 is a perspective drawing illustrating a "multiple choice examination which utilizes the principle of this invention.

FIG. 4 represents still another application of this invention. In FIG. 4 there is a representation of a multiple choice examination or test with hidden answers and a self-scoring technique. Referring now to FIG. 4. 430 represents the first side of a multiple choice test with representable questions 1 and 2 shown along with possible answers a, b, and c. The person taking the test circles a selected answer which marks the front side 430 and marks-through to the back surface 431. If the selected answer is correct at 432 the Thru-Mark will so indicate by circling a score at 433 which in this case is 10. When the wrong answer is circled as at 434 the score at 435 is not circled by the Thru-Mark. The circled scores are then transposed to the column 436 and totalled at 437. This can be done by the individual who is taking the exam if so desired.

In the application illustrated in FIG. 4 the Thru-Mark on side 431 can be produced by several means. One technique is to use micro encapsulated chemicals, see 438, which when coated on the surface and then broken by the pressure of the marking means react with chemicals croated on the paper to produce the Thru-Mark. This means is similar to NCR or carbonless carbon paper which is well known.

To prevent cheating by peeking at 431 (the reverse side) to determine the location of the correct answer this side can be covered by an opaque removable backing sheet 439. This sheet could also carry the micro capsule for carbonless paper or it could be old fashioned carbon paper used backward to mark side 435.

Figure 5:
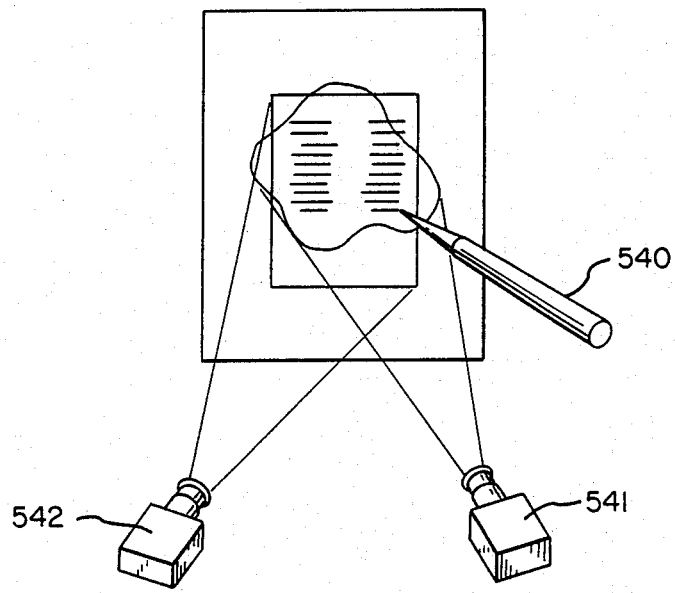
FIG. 5 is a drawing of a two image projection technique which utilizes the principles of this invention.

Projected images as shown in FIG. 5 can also be used to achieve many of the results of this invention. In this case, no Mark-Thru device is required. A pointer 540 or a finger indicates a point on the first record projected by projector 541. Spatially related information on the second record is projected by projector 542 sequentially to the first image. One projector with two sequential records can also be used. The pointer 541 remains in position thus essentially a mark is made on one record and a Thru-Mark is made on a second spatially related record. Most of the results previously discussed in this patent can be achieved in this manner.

Figure 6:
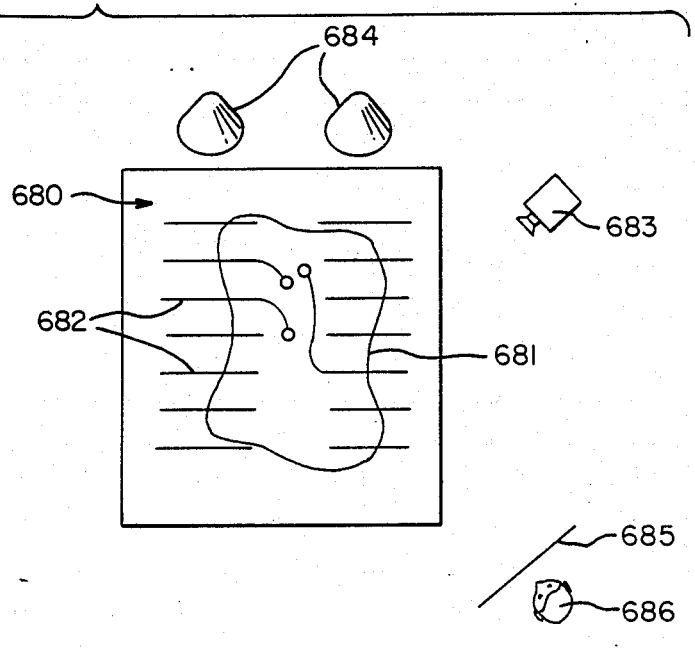
FIG. 6 is a view illustrating how an anaglyph type visual presentation can utilize the principles of this invention.

FIG. 6 illustrates how the well known anaglyph technique used in stereo photography can be used in a double image type system. In this version an anaglyph type presentation is presented on a surface 680. The Map 681 is colored red while the other record 682 is presented in green. This can be done by projector 683, a transparency or with a hard copy reproduction. The anaglyph transparency 680 is illuminated by lights 684 in which sequentially the color is switched from red to green and vice versa. When a green filter is used the red image becomes visible. This system is used like the double projected image of FIG. 5. This type of device can be constructed in any size and of any suitable material either as a large illuminated device with well known means of variable color illumination or as a hand-held device utilizing filters 685 for observer 686 and illuminated with ambient light.

What is claimed is:

1. In an instructional device for relating information on one surface to information on another surface, the improvement comprising:
    means defining a pair of positionally related surfaces, said surfaces defining a first side, said first side having spatially related information thereon,
    means defining a second side, said second side having information thereon spatially arranged to relate to specific portions of the information on said first side, and
    marking means for engagement with locations on said first side corresponding to locations of said specific portions of information thereon for producing a mark on said second side at a location which is antipodal to the information on said first side.

2. The instructional device of claim 1 in which the information on said first side includes a map projection and in which the information on said second side includes an antipodal map projection of the first side positioned 180° out of register with the map on the first side.

3. The instructional device of claim 1 in which said means for marking includes a hand-held indicator having a tip contactable with said first side.

4. A geographic teaching device for locating the antipode of any point on a map of the world comprising:
    a sheet having a first surface and a second surface,
    a world projection map on said first surface, an antipodal projection of said map on said second surface, positioned 180° out of register with the map on said first surface, means for marking one of said sheet surfaces at any selected locations, and means responsive to said means for marking for producing a mark on said second surface at the corresponding physical location on said sheet so that said surface mark is at an antipodal position with respect to said mark on said first surface.

5. The teaching device of claim 4 in which said means for producing a mark on said second surface includes at least one layer of rupturable microcapsules located between said surfaces.

6. The teaching device of claim 4 in which said means for producing a mark on said second surface includes mark through light transmitting connections extending between said surfaces.

7. An anaglyph teaching device comprising:

a display, said display including a red image and a green image, means on said red image including spatially distributed information, means on said green image including spatially distributed information, which information is content and spatially related to corresponding portions of the information on said red image, means for sequentially illuminating for visual viewing said green image with red light and said red image with green light, means for temporarily marking one of said images while viewing with complementary colored light, and means for switching the color of the viewing light without removing the mark applied by said means for marking.

8. The display device of claim 7 in which at least one of said images is pictorial.

9. The display device of claim 7 in which at least one of said images includes written material.

10. A display device comprising:

a surface, two spatially related informational records on said surface, one being in red and the other being in green, means for viewing the anaglyph defined by said images sequentially in red light and in green light, and means for temporarily marking one of said images such that said mark remains while the other image is illuminated.

11. In an instructional device for relating information on one surface to information on another surface, the improvement comprising:

means defining a pair of positionally related surfaces, said surfaces defining a first side, said first side having spatially related information thereon in the form of a map, means defining a second side, said second side having that information thereon spatially arranged to relate to a specific portion of said map on said first side, and marking means for engagement with positions on said first side corresponding to specific map portions for producing a mark on said second side at specific parts of said text related to the associated map portion.

* * * * *